No. 756,949. PATENTED APR. 12, 1904.
R. B. FERGUSON.
SPIRIT LEVEL.
APPLICATION FILED DEC. 19, 1902.
NO MODEL.
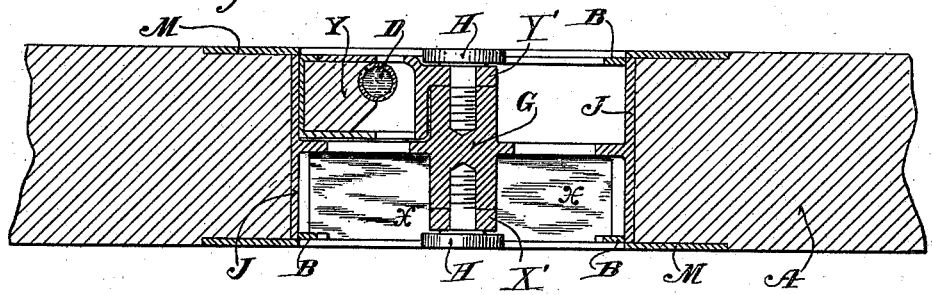
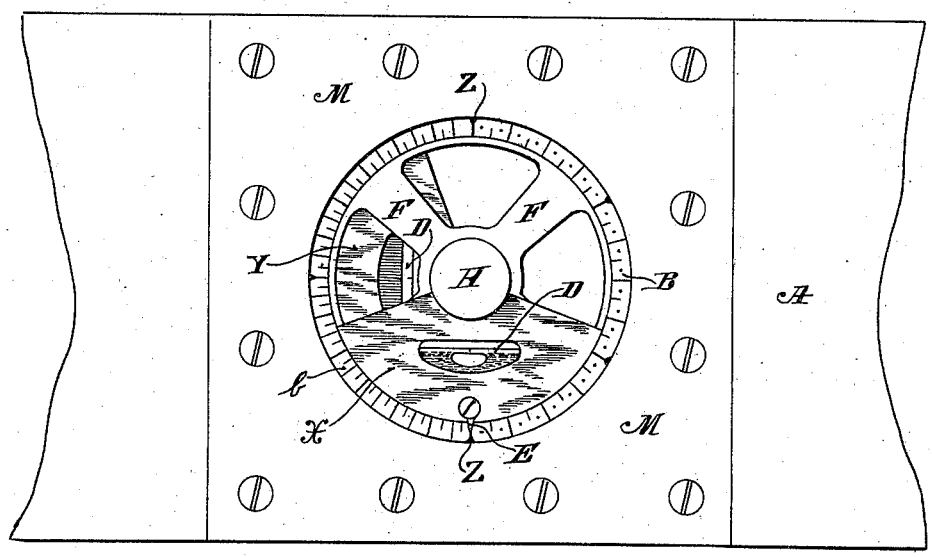
Witnesses
Chas. L. Hyde
M. C. Nickelson
Inventor
Robert B. Ferguson
By
Hagard & Warpham
His Attorneys No. 756,949. Patented April 12, 1904.

UNITED STATES PATENT OFFICE.

ROBERT B. FERGUSON, OF LOS ANGELES, CALIFORNIA.

SPIRIT-LEVEL.

SPECIFICATION forming part of Letters Patent No. 756,949, dated April 12, 1904.

Application filed December 19, 1902. Serial No. 135,915. (No model.)

*To all whom it may concern:*

Be it known that I, ROBERT B. FERGUSON, a citizen of the United States, residing at Los Angeles, in the county of Los Angeles and State of California, have invented new and useful Improvements in Spirit-Levels, of which the following is a specification.

The object of my invention is to combine a spirit-level and an angle-gage for use by carpenters, surveyors, architects, and others in order to find any angle, as well as a horizontal and perpendicular line, in any situation in which it may be used, and to provide means whereby the index-pointer thereon may be fixed at any angle desired. I accomplish this object by means of the device herein described, and shown in the accompanying drawings, in which—

Figure 1 is a transverse central longitudinal section of a spirit-level embodying my invention. Fig. 2 is a side view of the same.

In both of the views the level is shown in a horizontal position, and the initial-points Z on the circular scale are shown one directly over and the other directly below the center of the scale. On the opposite side of the level these initial-points will be on a horizontal plane with the center of the scale, the purpose of which will be hereinafter explained. Differently-graduated scales may be shown thereon, depending largely upon the use to which the level is to be put.

In the drawings, A represents the main body or stock of the level, extending transversely through which is a circular opening, and in this opening is disposed a central hub G, having four radial arms F extending therefrom to and connecting with the casing J surrounding said opening. On this hub is pivotally mounted the two sectors X and Y. In each of these sectors is placed a bubble-glass D. On the periphery of each of these sectors is mounted an index-pointer E. Surrounding this opening on both sides of the level is an annular ring B, on which is marked a scale *b*. The index-marks on this scale are so spaced apart thereon that the index-pointer may be so placed as to indicate when the level is in a horizontal or vertical plane and may be so placed as to indicate when the body of the level is at any angle to a horizontal or vertical plane. In the center of the hub G, I have mounted two thumb set-screws H, having screw-threaded shanks adapted to be screwed into screw-threaded openings in the center of the hub and by means of which the index-pointers can be set at any angle desired, the angle being indicated by the index-marks on the scale. The screws form axles on which the sectors Y and X are pivotally mounted, the screws passing through openings in extensions Y' and X', respectively, on these sectors, as shown in section in Fig. 1. The several parts are retained in place in the stock by the face-plates M.

To illustrate the adaptability of this level for carpenters' use, let us place one index-finger at the initial index-mark Z and set the same thereat by turning the thumb-screw until the sector is tightly held on the hub. This will fit the level for use in giving a horizontal plane. The other index-pointer is placed in like manner at a point on a horizontal plane with the center of the hub, indicated on the scale on the other side of the level. The level will then be in condition to indicate a vertical line, the openings between the radial spokes affording a plain view of the bubble-glass on either side of the level. By leaving one index-finger fixed in this position the bubble will indicate either vertical or horizontal lines, while the other side of the level may be used to adjust a surface to any desired angle without interfering with the fixed index-pointer, as the working parts of the respective sides may be made to move or remain fixed independent of the other side. The difference between two angles may be found as follows: The angle of the first surface or object is found, then fix the index-pointer in position by tightening thumb-screw, then in like manner find the angle of the second surface. The degrees between the two index-pointers E will show the difference between the angles.

Different plans of marking the dials will facilitate using the level for many purposes. The dial may be marked on one half of its surface in degrees from one to ninety, (not shown in cut,) while the other side may be divided in compass-marks or intermediate points and the placing of the index-fingers so that the indicated points on the scales are at right angles with each other. To find in degrees an angle of which only the intermediate position is known, fix the index-pointer on one side at the known angle, adjust the level so that the bubble on the same side shows in center of bubble-glass, then hold the other side so that the bubble is central in the glass, and as the markings on the scale are at right angles with each other the degrees will be shown by the index-pointer.

Having described my invention, what I claim as new, and desire to secure by Letters Patent, is—

1. A spirit-level comprising a stock having a transverse opening therethrough; a casing surrounding said opening; a central hub therein having radial arms extending therefrom to the casing; two sectors one on each side of the stock in said opening carrying bubble-glasses visible from either side of the stock; axles projecting from the center of the ends of said hub upon which said sectors are revolubly mounted and forming means to lock the sectors at any angle; a graduated scale surrounding said opening concentric with the axles on which the sectors rotate, index-pointers on said sectors.

2. In a spirit-level of the character herein described, a main stock having a transverse circular opening therethrough; a casing surrounding said opening; a hub therein secured to the casing by radial arms and having central screw-threaded sockets in each end thereof for the reception of the screw-threaded shanks on the thumb-screws; thumb-screws disposed in the center of said hubs and forming axles for the sectors and adapted to lock, when screwed tight, the sectors against movement on their axles; two sectors carrying bubble-glasses revolubly mounted in said opening on said axles, both bubble-glasses being visible from either side of the stock through said opening; index-pointers on the periphery of the sectors; an annular graduated scale around each end of the opening, the same being concentric with the axles of the sectors.

3. The herein-described level comprising the stock A having a transverse opening therethrough; a casing J in the stock surrounding said opening; a central hub G in said opening, the said hub being supported by radial arms F extending therefrom and uniting the same with the casing; two sectors X and Y visible through said opening from either side of said stock, the sectors being pivotally mounted on screws H passing through openings in extensions X' and Y' on said sectors; set-screws H forming axles therefor; and adapted to frictionally engage the sectors; index-pointers E on said sectors; an annular graduated scale b on the sides of the stock one at each end of and surrounding said opening, the scales being concentric with the axles of the sectors; a bubble-glass D in each of said sectors visible through said opening in either direction, substantially as herein shown and described.

In witness that I claim the foregoing I have hereunto subscribed my name this 12th day of December, 1902.

R. B. FERGUSON.

Witnesses:
HENRY T. HAZARD,
G. E. HARPHAM.